United States Patent Office 3,529,995
Patented Sept. 22, 1970

3,529,995
FLUORINE-CONTAINING COPOLYMER TREATED FABRICS
Samuel Smith, Roseville, and Patsy O. Sherman, Bloomington, Minn., assignors to Minnesota Mining and Manufacturing Company, St. Paul, Minn., a corporation of Delaware
No Drawing. Continuation-in-part of application Ser. No. 415,154, Dec. 1, 1964. This application Dec. 1, 1967, Ser. No. 687,090
The portion of the term of the patent subsequent to Dec. 5, 1984, has been disclaimed
Int. Cl. B32b 27/08; B44d 1/14
U.S. Cl. 117—161                    5 Claims

ABSTRACT OF THE DISCLOSURE

Fabrics provided with various resin treatments and additionally with treatments of copolymers of fluorinated and hydroxyl-containing monomers exhibit durability of oil and stain resistance.

This application is a continuation-in-part of copending application Ser. No. 415,154 filed Dec. 1, 1964, now U.S. Pat. No. 3,356,628.

The present invention relates to novel and useful fluorine-containing copolymers. In one aspect the invention relates to fluorocarbon group-containing surface treating agents. In another aspect it relates to treated substrates which are durably oil and water repellent.

Various fluorocarbon group-containing polymers suitable for treating surfaces to render them oil and water repellent are known, thus see U.S. Pat. Nos. 2,803,615, 3,068,187 and 3,102,103. The resulting fluorocarbon surface treatments, although very effective, have often been adversely affected by repeated cleanings. It is therefore much to be desired to improve the durability of such treatments, particularly in articles which are repeatedly laundered or dry-cleaned in normal use such as clothing and other fabric and leather articles. In the present invention certain reactive groups in the polymer are utilized to obtain improved durability to cleaning.

An object of this invention is to provide certain novel fluorocarbon group-containing polymers.

Another object of this invention is to provide novel oil and water repellent treatments for substrates.

Another object of this invention is to provide new and useful oil and water repellent treating agents.

Another object of this invention is to provide oil and water repellent treatments of improved durability to laundering and dry-cleaning.

Another object of this invention is to provide solvent and aqueous dispersions of fluorocarbon group-containing polymers which are capable of being dispensed from pressurized aerosol containers.

Still another object of this invention is to provide fluorocarbon copolymers which contain recurring reactive groups.

Still another object of this invention is to provide durably oil and water repellent articles.

Still another object of the invention is to provide durably oil and water repellent fibers.

Yet another object of the invention is to provide durably oil and water repellent textile fabrics.

Various other objects and advantages will become apparent to those skilled in the art upon reading the accompanying description and disclosure.

The polymers of the present invention have carbon to carbon main chains or back-bones and contain recurring monovalent perfluorocarbon groups having from four to eighteen carbon atoms and recurring hydroxyl radicals.

The polymers contain at least 5 percent fluorine which is in the perfluorocarbon groups and at least 0.5 and up to about 14 percent hydroxyl radicals. Preferably they contain from 20 to 70 percent fluorine and from 0.05 to 2 percent hydroxyl radicals, these ranges being given on a weight basis. They comprise a minimum of two different recurring units, one containing the fluorocarbon group and one containing the hydroxyl radical.

The polymers of the invention are prepared by the addition copolymerization of at least two different ethylenically unsaturated monomers through their ethylenically unsaturated groups, one monomer containing the fluorocarbon group and the other containing the hydroxyl radical. Each recurring unit of the polymer is thus the result of the addition polymerization of a monomer molecule.

Certain of the polymers of the invention contain more than two kinds of recurring groups, e.g. a plurality of different fluorocarbon containing units, a plurality of different hydroxyl-containing units and/or one or more recurring units which contain neither fluorocarbon nor hydroxyl. Further, the different types of units can appear randomly or in some particular arrangement. Thus, block and graft copolymers (i.e. segmented copolymers) are included as are homogeneous polymers (in which the component monomeric units appear in more or less random fashion therein). Segmented copolymers are discussed at some length in U.S. Pat. 3,068,187.

The fluorocarbon groups of the polymers are saturated and contain at least 3, generally from 4 to 18, fully fluorinated carbon atoms. It is of critical importance that the fluorocarbon groups contain at least 3 carbon atoms to provide oil and water repellent properties and the preferred number is 6–10. Highly satisfactory properties of oil and water repellence and relative economy of production are combined in products in which the fluorocarbon groups contain 6 to 10 carbon atoms.

The complete fluorocarbon group can be a perfluoroalkyl group having an open (acyclic) straight- or branched-chain, or a cyclic structure (e.g. a perfluorocyclohexyl group having a 6-membered ring structure) or it can consist of a combination of perfluoroalkyl straight chain and perfluorocycloaliphatic groups. The perfluorocarbon group may be bonded to a sulfur-atom of the molecule through either a cyclic or acyclic carbon atom (that is, this carbon atom may or may not be in a ring) and two carbon atoms of the fluorocarbon group may be linked together by an oxygen atom or three carbons may be linked together by a nitrogen atom, since oxygen and nitrogen provide very stable linkages between fluorocarbon groups and do not interfere with the highly stable and inert character of the complete fluorocarbon group or structure, as is shown, for instance, in U.S. Pat. Nos. 2,500,388 and 2,616,927.

The copolymers of the invention are useful for imparting highly durable repellence to oil and water and resistance to soiling to a variety of substrates. Fibrous and porous surfaces may be treated with the polymers to achieve these results. Illustrative acticles to be treated are textiles, paper, wood, leather, fur, and asbestos. Among the articles which are advantageously treated are apparel, upholstery, draperies, carpeting, bags, containers, luggage, hand bags, shoes and jackets.

When the substrate treated is a fabric, 0.05 to 5 percent (preferably 0.1 to 1 percent) by weight of the copolymer based on the weight of the fabric produces desirable surface properties. Illustrative textiles which can be advantageously treated with the copolymers of this invention are those based on natural fibers, e.g. cotton, wool, mohair, linen, jute, silk, ramie, sisal, kenaf, etc. and those based on synthetic fibers, e.g. rayon, acetate, acrylic, polyester, saran, azylon, nytril, nylon, spandex, vinyl, olefin, vinyon and glass fibers (these designations of synthetic fibers are the proposed generic terms set up by the Federal Trade Commission). The treatment of these fabrics with the compositions of this invention imparts no adverse effect to the hand of the fabric and in some cases has a softening effect, thereby improving the hand.

It is not known with certainty why the polymers of the present invention which contain hydroxyl radicals exhibit superior properties of durability when compared to similar polymers containing no hydroxyl radicals. The ability of the highly polar hydroxyl radicals to assume relatively strong bonds of attraction with polar substrates may be responsible. These improvements, particularly with regard to resistance to desorption of the polymer from the substrate by a good solvent for the polymers, are manifest to a greater degree when the copolymer is used to treat a highly polar substrate (e.g. cotton) than when it is used to treat a relatively non-polar surface (e.g. polyester fiber). The present invention, however, is in no way limited by the mechanism of its operation.

The polymers of the invention are applied as surface treatments by known methods of coating such as spraying, brushing or impregnation from solution in organic solvents or dispersions in aqueous or organic solvents. A particularly convenient method of application is as an aerosol spray from a pressured aerosol container. The hydroxyl groups of the polymers can be reacted with long chain isocyanates to obtain increased solubility in oil type solvents such as perchloroethylene which are widely used in aerosol cans, etc.

The polymers may be used as the sole component in the treating vehicle or as a component in a complex multi-ingredient formulation. The substrate can be treated with one or more conventional finishes (such as mildew preventives, moth resisting agents, modified crease resistant resins, lubricants, softeners, sizes, flame retardants, antistatic agents, dye fixatives, and water repellents) and then with the copolymer or alternatively with a conventional finish or finishes and the copolymer simultaneously. Numerous resin treatments are well known in the art. See, for example, Advances in Textile Processing, vol. 1, edited by J. E. Lynn and J. J. Press, Textile Book Publishers, Inc. (1961). In the treatment of paper the polymer may be present as an ingredient in a wax, elastomer or wet strength resin formulation. The finishes applied with the polymers of the invention are, however, ordinarily chosen so that they do not react rapidly with hydroxyl. Thus, compounds containing acyl halides, methylolated ureas and melamines, arylene diisocyanates, etc. can be either added to the treating bath containing polymers of the invention or in a subsequent step.

The general structural formula of the fluorocarbon containing monomers employed in this invention (and from which the fluorocarbon group-containing units of the polymers are formed) is $R_fP$ where $R_f$ is a fluorocarbon group as previously defined and P is a radical containing a group which is polymerizable by free radical mechanisms. Illustrative types of these fluorine-containing monomers are the acrylate, methacrylate and α-chloroacrylate esters (acrylate-type esters) of N-alkanol perfluoroalkane sulfonamides such as N-butyl perfluorooctanesulfonamidoethyl acrylate, N-ethyl perfluorooctanesulfonamidoethyl methacrylate, N-methyl perfluorobutanesulfonamidobutyl acrylate and N-ethyl perfluorooctanesulfonamidoethyl α-chloroacrylate; of omega-perfluoroalkyl alkanols such as 1,1-dihydroperfluorohexyl acrylate, 1,1-dihydroperfluorodecyl methacrylate, 1,1-dihydroperfluorooctyl α-chloroacrylate, 3-(perfluorooctyl)-propyl acrylate, 2-(perfluoroheptyl)-ethyl methacrylate, 11-(perfluorooctyl)-undecyl acrylate and 3-(perfluoroheptyl)-propyl chloroacrylate; and of 1,1,3-trihydroperfluoroalkanols such as 1,1,3-trihydroperfluorooctyl acrylate. Other types of monomers which are employed in preparing the polymers of the invention are 1,1-dihydroperfluoroalkyl acrylamides such as 1,1-dihydroperfluorooctyl acrylamide; 1,1-dihydroperfluoroalkyl vinyl ethers such as 1,1-dihydroperfluorohexyl vinyl ether; vinyl perfluoroalkyl ketones such as vinyl perfluorooctyl ketone; and allyl perfluoroalkyl ketones such as allyl perfluorooctyl ketone.

Among the hydroxyl radical-containing monomers suitable for use in the copolymers of the present invention (from which the hydroxyl radical containing units of the polymers are formed) are 2-hydroxypropyl methacrylate, 2-hydroxypropyl acrylate, hydroxethyl acrylate, hydroxyethyl methacrylate, hydroxyethyl vinyl ether, allyl alcohol and N-2-hydroxyethyl acrylamide. They can be mono- or polyunsaturated and the ethylenically unsaturated groups can be located in either terminal or internal positions in the compounds.

Preferably in these monomers, at least 2 carbon atoms separate the hydroxyl group from heteroatoms such as oxygen and nitrogen in order to avoid crosslinking on heating or storage in the form of concentrated dispersions or solutions. On the other hand, the polymers of the present invention may be crosslinked by treating them with a compound containing two or more groups capable of condensing with, or adding to, a hydroxyl group. Thus, they may be crosslinked by reaction with a diacyl halide, a di- or polymethylolated urea or melamine resin or an arylene diisocyanate. For most purposes, however, crosslinking of the final product is not necessary for excellent surface treatment properties.

As noted previously, the copolymers can also contain recurring units which contain neither fluorocarbon groups nor hydroxyl radicals. They are formed from ethylenically unsaturated monomers of corresponding structures. These monomers are free of groups which co-react with hydroxyl and include ethylene, vinyl acetate, vinyl chloride, vinyl fluoride, vinylidene chloride, vinylidene fluoride, vinyl chloroacetate, acrylonitrile, vinylidene cyanide, styrene, alkylated styrenes, halogenated styrenes, alkyl and epoxyalkyl esters of acrylic acid, methacrylic acid and α-chloroacrylic acid, methacrylonitrile, vinylcarbazole, vinyl pyrolidone, vinyl pyridine, vinyl alkyl ethers, vinylalkyl ketones, butadiene, chloroprene, fluoroprene and isoprene.

The copolymers of this invention are generally prepared using emulsion, bulk or solution polymerization techniques. Among the solvents which can be used as media in the solution polymerizations and as application solvents are trichlorofluoromethane, 1,1,2-trichloro - 1,2,2 - trifluoroethane, benzene, benzotrifluoride, xylene hexafluoride, 1,1,1-trichloroethane and butyl acetate. Such solvents are free of groups capable of reacting with hydroxyl radicals.

In the treatment of fabrics, the copolymers of this invention may be applied prior to, subsequent to or in admixture with other treating agents, such as modified crease resisting resins, sizes, softeners, and water repellents.

The following examples are offered to furnish a better understanding of the present invention and are not to be construed as in any way limiting thereof. While the surface treatment portions of the examples relate to fabrics, it should be understood that other materials of the previously defined types can be treated in essentially analogous manners. All percentages are by weight unless otherwise specified.

The fluorinated monomers employed in the examples are:

(I) $C_7F_{15}CH_2OCOC(CH_3)=CH_2$
(II) $C_2F_{17}SO_2N(CH_3)C_{11}H_{22}OCOCH=CH_2$
(III) $C_8F_{17}SO_2N(CH_3)C_{10}H_{20}OCOCH=CH_2$
(IV) $C_8F_{17}SO_2N(CH_3)C_{11}H_{22}OCOC(CH_3)=CH_2$
(V) $C_7F_{15}C_2H_4OCOC(CH_3)=CH_2$

Methods of preparing monomers I–IV are disclosed in U.S. Pats. 2,642,416, 2,803,615 and 3,102,103. Monomer V is prepared as follows:

To a solution of 0.656 g. (0.004 mole) of azobisisobutyronitrile in 99.2 g. (0.2 mole) of 1-iodoperfluoroheptane are added 17.2 g. (0.2 mole) of vinyl acetate (which had been previously treated with potassium hydroxide at 10° C. to remove inhibitor and distilled). The mixture is heated slowly. An exotherm occurs at 80–90° C. which carries the temperature to 110–116° C. for about 10 minutes. Heating at 80° C. is continued for 2 hours after which unreacted vinyl acetate and 1-iodoperfluoroheptane (47.6 g.) are removed from the reaction mixture under a vacuum of 2–5 millimeters of mercury at 70–80° C. 57.7 g. of the crude adduct $C_7F_{15}CH_2CHIOCOCH_3$ remain.

A slurry of 7.45 g. (0.196 mole) of lithium aluminum hydride in 75 ml. of anhydrous ether is stirred rapidly and maintained at a gentle reflux while 80.0 g. (0.138 mole) of crude adduct from the preceding reaction in 75 ml. of anhydrous ether are added over a 1.5 hour period. The reaction mixture is allowed to stir and reflux for about 17 hours and is then cooled to 10° C. 25 ml. of ethyl acetate are added and then 75 ml. of 30 percent sulfuric acid. The viscous mixture is refluxed for 3 hours, the ether layer is separated, extracted two times with 25 ml. of 5 percent aqueous sodium bisulfite and dried over magnesium sulfate. Vacuum distillation through a 10 cm. glass helice-packed micro distillation assembly gives 34.5 g. of distillate, boiling point 82–84° C. (10 mm.); $n_D^{25} = 1.3212$. Gas-liquid chromatographic analysis shows the distillate to be 76.2 percent of a lower boiling component and about 23 percent of a slightly higher boiling component. 34 g. of distillate are refluxed for 2 hours in 100 ml. of 10 percent alcoholic potassium hydroxide. The mixture is neutralized with 10 percent aqueous hydrochloric acid. Sodium chloride is added until the solution is saturated. The phases are separated and the organic layer diluted with ether and dried over magnesium sulfate. Vacuum distillation gives 25.0 g. of distillate, boiling point 84° C. (10 mm.); $n_D^{25} = 1.3186$. Gas-liquid chromatography analysis shows that the low boiling component is 99 percent pure $C_7F_{15}CH_2CH_2OH$.

Twenty-five grams of $C_7F_{15}C_2H_4OH$, 6.2 grams of methacrylic acid, 150 ml. of heptane and 10 drops of concentrated $H_2SO_4$ are refluxed for three hours while water is being collected in a Dean-Stark trap. At the end of this time the temperature is decreased to 35–40° C. and solid $Ca(OH)_2$ is added until the solution is neutral to litmus. Solids are filtered off and after stripping of the heptane, 25 grams of $C_7F_{15}C_2H_4OCOC(CH_3)=CH_2$ are obtained.

The procedure employed to prepare the polymers in ampoules in the examples involves the following sequence of steps:

(a) Charging the reactants to a heavy-walled Pyrex glass ampoule.
(b) Removing oxygen by freezing the ampoule and its contents in liquid air, and evacuating the ampoule to a pressure of less than 0.01 mm. mercury.
(c) Sealing the degassed ampoule.
(d) Warming the sealed ampoule until the contents are melted.
(e) Polymerizing the contents by placing the ampoule in an end-over-end rotator in a water bath at the indicated temperatures.

The procedure employed to prepare the polymers in screw cap bottles involves the following sequence of steps:

(a) Charging the reactants to a screw cap bottle equipped with a self-sealing rubber gasket.
(b) Removing oxygen by flushing the bottle with a stream of oxygen-free nitrogen gas.
(c) Sealing the bottle.
(d) Polymerizing the contents by placing in an end-over-end rotator in a water bath at the specified temperature and for the specified period of time.

The fabric treatments in the examples are as follows:

The fabric is immersed in a pad bath (containing the ingredients as indicated), the fabrics are run through rubber squeeze rolls at a nip pressure of 30 p.s.i. and then cured.

The water repellency of the treated fabrics is measured by Standard Test No. 22–52, published in the 1952 Technical Manual and Yearbook of the American Association of Textile Chemists and Colorists, vol. XXVIII, page 136. The "spray rating" is expressed on a 0 to 100 scale, wherein 100 is the highest possible rating.

The oil repellency test is based on the different penetrating properties of two hydrocarbon liquids, mineral oil and n-heptane. Mixtures of these two liquids are miscible in all proportions and show penetrating properties which increase with an increase in the n-heptane content of the mixture. The oil repellency rating numbers used herein and the compositions of the corresponding test solutions are as follows:

| Oil Repellency Rating | Percent | |
|---|---|---|
| | Heptane by volume | Mineral Oil by volume |
| 150 | 100 | 0 |
| 140 | 90 | 10 |
| 130 | 80 | 20 |
| 120 | 70 | 30 |
| 110 | 60 | 40 |
| 100 | 50 | 50 |
| 90 | 40 | 60 |
| 80 | 30 | 70 |
| 70 | 20 | 80 |
| 60 | 10 | 90 |
| 50 | 0 | 100 |
| 0 | | (¹) |

¹ No holdout to mineral oil.

To measure the oil repellency of a treated fabric, 3″ x 8″ swatches thereof are cut and placed flat on a table. A drop of each oil mixture is gently placed on the surface of the fabric. The number corresponding to that mixture containing the highest percentage heptane which does not penetrate or wet the fabric after three minutes contact is considered the oil repellency rating of the sample.

The laundering cycle referred to herein is as follows: The treated fabrics are laundered in a 9 lb. load, agitating, automatic washing machine using water at 140° F. and a commercial detergent and then tumble-dried in an automatic drier for 20 minutes at 190° F. before being tested. They are not ironed after drying.

The dry cleaning cycle referred to herein is as follows: The treated fabrics are dry cleaned in a commercial dry cleaning establishment using perchloroethylene containing a potassium oleate soap as the vehicle. They are not pressed after cleaning.

EXAMPLE 1

Emulsion polymers of monomer I (A) Copolymer of monomer I and 2-hydroxy propyl methacrylate.—A bottle is charged with 4.95 grams of monomer I, 0.05 gram of hydroxypropyl methacrylate, 6.3 grams of water, 2.7 grams of acetone, 0.15 gram of a polyoxyethylene lauryl ether emulsifier (available from the Atlas Powder Company under the trade designation "Brij 35"), 0.10 gram of $$C_8F_{17}SO_2NHC_3H_6N(CH_3)_2 \cdot HCl$$

0.01 gram of $K_2S_2O_8$ and 0.025 gram of t-dodecyl mercaptan and sealed. After 16 hrs. reaction at 50° C., a clear, colorless latex containing a small amount of precoagulum is obtained. The polymer solids in this latex contain 60.3 percent by weight of fluorine and 0.118 percent by weight of hydroxyl radical.

(B) Homopolymer of monomer I.—A bottle is charged with 5 grams of monomer I, 6.3 grams of water, 2.7 grams of acetone, 0.15 gram of "Brij 35", 0.10 gram of $C_8F_{17}SO_2NHC_3H_6N(CH_3)_2 \cdot HCl$, 0.01 gram of $K_2S_2O_8$ and 0.025 gram of t-dodecyl mercaptan, sealed and reacted for 16 hours at 50° C. to form a clear, colorless latex containing a bit of precoagulum.

These polymers are used to treat cotton and polyester cotton fabrics as follows: The polymer latexes are formulated to contain 0.5% polymer solids and 10% triazine-formaldehyde resin, 1% magnesium chloride and 2 drops of 70% glycolic acid per 100 ml. of pad bath. After padding with these emulsions, the fabrics are cured 10 min. at 300° F. Oil and spray ratings are measured initially, after laundering and tumble-drying, and after three commercial dry cleanings. The results The results of tests on all five of these lots are given in Table II. They demonstrate the improved initial properties as well as the improved durabilities obtained with the hydroxy propyl methacrylate copolymer treatment in both the presence and absence of "Cymel 300" resin.

TABLE II

| Polymer | Fabric | Initial | | Laundered 3 times and tumble dried | | Dry cleaned 3 times | |
|---|---|---|---|---|---|---|---|
| | | Oil | Spray | Oil | Spray | Oil | Spray |
| A. Monomer II: Hydroxypropyl methacrylate copolymer | Cotton | 110 | 100 | 60 | 50 | 130 | 70 |
| | Nylon | 130 | 100 | | | 130 | 80 |
| | Rayon | 130 | 80 | | | 140 | 50 |
| | Wool | 130 | 100 | | | 110 | 70 |
| B. Monomer II: Homopolymer | Cotton | 100 | 80 | 0 | 0 | 90 | 50 |
| | Nylon | 120 | 100 | | | 0 | 0 |
| | Rayon | 120 | 50 | | | 0 | 0 |
| | Wool | 130 | 100 | | | 0 | 0 |
| C. Monomer II: Isopropyl methacrylate copolymer | Cotton | 110 | 80 | 0 | 0 | 70 | 0 |
| | Nylon | 130 | 90 | | | 0 | 0 |
| | Rayon | 130 | 50 | | | 0 | 0 |
| | Wool | 140 | 100 | | | 0 | 0 |
| A. Monomer II: Hydroxypropyl methacrylate copolymer plus "Cymel 300" | Cotton | 110 | 100 | 80 | 70 | 140 | 70 |
| | Nylon | 140 | 90 | | | 130 | 70 |
| | Rayon | 130 | 80 | | | 140 | 70 |
| | Wool | 140 | 100 | | | 120 | 80 |
| B. Monomer II: Homopolymer plus "Cymel 300" | Cotton | 100 | 70 | 0 | 0 | 70 | 0 |
| | Nylon | 120 | 80 | | | 0 | 0 |
| | Rayon | 140 | 50 | | | 0 | 0 |
| | Wool | 140 | 100 | | | 0 | 0 | shown in Table I demonstrate the relative initial performance, and the durability achieved with these treatments.

The relative reactivities of polymers A, B and C each co-applied with "Cymel 300" are shown in the following manner: Films of each mixture are cast on glass plates,

TABLE I

| Polymer | Fabric | Initial | | Laundered | | Dry cleaned 3 times | |
|---|---|---|---|---|---|---|---|
| | | Oil | Spray | Oil | Spray | Oil | Spray |
| A. Monomer I: Hydroxypropyl methacrylate copolymer | Cotton polyester/cotton | 70 | 100 | 50 | 100 | | |
| | | 110 | 100 | 80 | 100 | | |
| | do | 90 | 100 | | | 90 | 70 |
| | | 110 | 100 | | | 90 | 70 |
| B. Monomer I: Homopolymer | Cotton polyester/cotton | 80 | 100 | 0 | 70 | | |
| | | 120 | 100 | 60 | 100 | | |
| | do | 90 | 100 | | | 60 | 50 |
| | | 120 | 100 | | | 50 | 50 |

EXAMPLE 2

Solution polymers of monomer II (A) Copolymer of monomer II and 2-hydroxypropyl methacrylate.—A bottle is charged with 4.76 grams of monomer II, 0.24 gram (20 mol percent) of hydroxypropyl methacrylate, 9 grams of 1,1,1-trichloroethane and 0.025 gram of benzoyl peroxide and sealed. After 18 hours reaction at 75° C., a polymer is obtained which contains 41.7 percent by weight of fluorine and 0.565 percent by weight of hydroxyl radical.

(B) Homopolymer of monomer II.—A bottle is charged with 5 grams of monomer II, 9 grams of 1,1,1-trichloroethane and 0.025 gram of benzoyl peroxide, sealed and reacted for 18 hours at 75° C. to form the polymer.

(C) Copolymer of monomer II and isopropyl methacrylate.—A bottle is charged with 4.76 grams of monomer II, 0.24 gram of isopropyl methacrylate (a non-reactive analog of hydroxypropyl methacrylate), 9 grams of 1,1,1-trichloroethane and 0.025 gram of benzoyl peroxide, sealed and reacted for 18 hours at 75° C. to form the polymer.

These three solutions are diluted to 0.6% solids with 1,1,1-trichloroethane and padded onto various fabrics composed of the natural and synthetic fibers. After padding, the fabrics are given a 5 minute cure at 130° C.

In a second evaluation polymers A and B are coapplied with hexamethoxymethylmelamine resin (available under the trade designation "Cymel 300" from the American Cyanamid Co.) from 1,1,1-trichloroethane solutions containing 0.6% polymer, 0.2% "Cymel 300," 0.04% p-toluene sulfonic acid and 4.0% isopropanol. The fabrics are padded at 30 lbs. nip pressure and cured 5 minutes at 130° C.

heated 15 minutes at 150° C. and dissolved in benzotrifluoride. The insoluble residues in each case are separated and analyzed by infrared. The insoluble residues from the polymer B and C mixtures contain no fluorochemical polymer while that of polymer A clearly contains a substantial amount of fluorochemical polymer. Thus, of the three polymers, only the copolymer of monomer II and 2-hydroxypropyl methacrylate reacted with the "Cymel 300" to form an insoluble, crosslinked resin.

EXAMPLE 3

Solution polymers of monomer III (A) Copolymer of monomer III and 2-hydroxypropyl methacrylate.—A bottle is charged with 4.76 grams of monomer III, 0.24 grams of hydroxypropyl methacrylate, 5.4 grams of 1,1,1-trichloroethane and 0.015 gram of benzoyl peroxide and sealed. After reacting for 20 hours at 75° C., a polymer is obtanied which contains 42.5 percent by weight of fluorine and 0.565 percent by weight of hydroxyl radical. This solution is diluted to 0.6% solids with 1,1,1-trichloroethane for treating fabrics.

(B) Homopolymer of monomer III.—A bottle is charged with 5 grams of monomer III, 5.4 grams of 1,1,1-trichloroethane and 0.015 gram of benzoyl peroxide sealed, and reacted for 20 hours at 75° C. to form the polymer. This solution is diluted to 0.6% solids with a 1:1 benzotrifluoride:1,1,1-trichloroethane mixture for treating fabrics.

The fabrics listed in Table III are padded with these dilute solutions and cured 5 minutes at 130° C. As shown in the table, superior initial performance and durability are obtained from the copolymer of A.

TABLE III

| Polymer | Fabric | Initial | | Laundered 3 times and tumble dried | | Dry cleaned 3 times | |
|---|---|---|---|---|---|---|---|
| | | Oil | Spray | Oil | Spray | Oil | Spray |
| A. Monomer III: Hydroxypropylmethacrylate copolymer | Cotton | 110 | 100 | 60 | 50 | 110 | 70 |
| | Nylon | 120 | 100 | | | 120 | 70 |
| | Rayon | 130 | 80 | | | 130 | 50 |
| | Wool | 130 | 100 | | | 110 | 70 |
| B. Monomer III: Homopolymer | Cotton | 110 | 70 | 0 | 0 | 120 | 0 |
| | Nylon | 130 | 100 | | | 90 | 50 |
| | Rayon | 120 | 50 | | | 130 | 0 |
| | Wool | 120 | 100 | | | 0 | 0 |

EXAMPLE 4

Solution polymers of monomer IV (A) Copolymer of monomer IV and 2-hydroxypropyl methacrylate.—A glass ampoule is charged with 2.85 grams of monomer IV, 0.15 gram of hydroxypropyl methacrylate, 12 grams of 1,1,1-trichloroethane and 0.015 gram of benzoyl peroxide and sealed. After reacting for 16 hours at 75° C., a polymer is obtained which contains 41 percent by weight of fluorine and 0.59 percent by weight of hydroxyl radical.

(B) Homopolymer of monomer IV.—A glass ampoule is charged with 3 grams of monomer IV, 12 grams of 1,1,1-trichloroethane and 0.015 gram of benzoyl peroxide, sealed and reacted for 16 hours at 75° C. to form the polymer.

These solutions are diluted to 0.3% solids with 1,1,1-trichloroethane, 0.03% p-toluene sulfonic acid is added, and several fabrics are padded and cured 5 minutes at 130° C. As shown by Table IV, superior initial performance and durability are obtained from the copolymer of A.

TABLE IV

| Polymer | Fabric | Initial | | Dry cleaned 3 times | |
|---|---|---|---|---|---|
| | | Oil | Spray | Oil | Spray |
| A. Monomer IV: Hydroxypropyl methacrylate copolymer | Cotton | 90 | 100 | 120 | 70 |
| | Nylon | 120 | 100 | 100 | 70 |
| | Rayon | 110 | 80 | 100 | 50 |
| | Wool | 120 | 90 | 90 | 80 |
| B. Monomer IV: Homopolymer | Cotton | 70 | 80 | 120 | 70 |
| | Nylon | 110 | 80 | 0 | 50 |
| | Rayon | 90 | 70 | 120 | 50 |
| | Wool | 110 | 90 | 50 | 70 |

EXAMPLE 5

Solution copolymers of monomer II with 2-hydroxypropyl acrylate and 2-hydroxyethyl methacrylate.

A glass ampoule is charged with 2.85 grams of monomer II, 0.15 gram of hydroxypropyl acrylate, 5.4 grams of 1,1,1-trichloroethane and 0.015 gram of benzoyl peroxide and sealed. After reaction for 16 hours at 75° C., a polymer is obtained which contains 41.6% by weight of fluorine and 0.653 percent by weight of hydroxyl radical.

A second ampoule is charged and reacted in the same way except that the hydroxypropyl acrylate is replaced by an equal amount of hydroxyethyl methacrylate. The contents of the ampoule are reacted for 16 hours at 75° C. The resulting polymer contains approximately the same percentages of fluorine and hydroxyl radical as the polymer of the preceding lot.

The polymer solutions are diluted to 0.3% polymer solids with 1,1,1-trichloroethane and 0.03% p-toluene sulfonic acid is added. Various fabrics are padded with the solutions and cured 5 minutes at 130° C. Tests run on the samples are compared in Table V with tests run on fabric samples treated with twice the concentration of the homopolymer of the same monomer and previously reported in Table II.

TABLE V

| Polymer | Treating soln. concentration polymer solids, percent | Fabric | Initial | | Dry cleaned 3 times | |
|---|---|---|---|---|---|---|
| | | | Oil | Spray | Oil | Spray |
| Monomer II: Hydroxypropyl acrylate copolymer | 0.3 | Cotton | 90 | 100 | 90 | 80 |
| | | Nylon | 120 | 90 | 90 | 70 |
| | | Rayon | 110 | 80 | 120 | 70 |
| | | Wool | 140 | 100 | 120 | 70 |
| Monomer II: Hydroxyethyl methacrylate | 0.3 | Cotton | 90 | 80 | 100 | 80 |
| | | Nylon | 110 | 100 | 110 | 80 |
| | | Rayon | 100 | 80 | 120 | 70 |
| | | Wool | 130 | 90 | 120 | 80 |
| Monomer II: Homopolymer | 0.6 | Cotton | 100 | 80 | 90 | 50 |
| | | Nylon | 120 | 100 | 0 | 0 |
| | | Rayon | 120 | 50 | 0 | 0 |
| | | Wool | 130 | 100 | 0 | 0 |

EXAMPLE 6

Solution polymers of monomer I (A) Copolymer of monomer I and 2-hydroxypropyl methacrylate.—A glass ampoule is charged with 2.85 grams of monomer I, 0.15 gram of hydroxypropyl methacrylate, 12 grams of 1,1,2-trichloro-1,2,2-trifluoroethane and 0.03 gram of benzoyl peroxide and sealed. After reacting for 19 hours at 75° C., a polymer is obtained which contains 57.8 percent by weight of fluorine and 0.59 percent by weight of hydroxyl radical.

(B) Homopolymer of monomer I.—A glass ampoule is charged with 3 grams of monomer I, 12 grams of 1,1,2 - trichloro - 1,2,2 - trifluoroethane and 0.03 gram of benzoyl peroxide, sealed and reacted for 19 hours at 75° C. to form the polymer.

These two solutions are diluted to 1% polymer solids with 2:1 benzotrifluoride:1,1,2-trichloro - 1,2,2 - trifluoroethane, 0.02% p-toluene sulfonic acid is added and the solutions are used to treat several fabrics. The fabrics are padded and cured 5 minutes at 130° C. Oil and spray ratings are measured initially, after laundering, after commercial dry cleaning, and in some cases after extraction with xylene hexafluoride for 24 hours in a Soxhlet flask followed by a 5 minute cure at 130° C. The results are as follows:

75° C., a polymer is obtained which contains 34.7 percent fluorine and 1.18 percent hydroxyl radical.

14.6 grams of this solution (3.0 grams polymer) and 12.9 grams of a 7% perchloroethylene solution of:

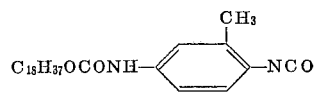

TABLE VI

| Polymer | Fabric | Initial | | Laundered and tumble dried | | Dry cleaned | | Extracted | |
|---|---|---|---|---|---|---|---|---|---|
| | | Oil | Spray | Oil | Spray | Oil | Spray | Oil | Spray |
| A. Monomer I: Hydroxypropyl methacrylate copolymer | Cotton | 100 | 100 | 70 | 100 | 100 | 90 | 90 | 100 |
| | Polyester | 100 | 100 | 80 | 100 | 90 | 90 | | |
| | Acrylic | 110 | 100 | 50 | 90 | 80 | 90 | | |
| | Nylon | 110 | 100 | 60 | 80 | 100 | 90 | | |
| | Rayon | 110 | 90 | 60 | 50 | 110 | 80 | 70 | 70 |
| B. Monomer I: homopolymer | Cotton | 100 | 100 | 0 | 0 | 80 | 80 | 0 | 0 |
| | Polyester | 110 | 100 | 80 | 100 | 50 | 70 | | |
| | Acrylic | 100 | 100 | 0 | 0 | 0 | 0 | | |
| | Nylon | 100 | 100 | 0 | 0 | 0 | 0 | | |
| | Rayon | 130 | 90 | 0 | 0 | 0 | 0 | 0 | 0 |

EXAMPLE 7

Solution polymers of monomer V (A) Copolymer of monomer V and 2-hydroxypropyl methacrylate.—A glass ampoule is charged with 2.85 grams of monomer V, 0.15 gram hydroxypropyl methacrylate, 12 grams of 1,1,2-trichloro-1,2,2-trifluoroethane and 0.03 gram of benzoyl peroxide and sealed. After 26 hours of reaction at 75° C., a polymer is obtained which contains 56.2 percent by weight of fluorine and 0.59 percent by weight of hydroxyl radical. This solution is diluted to 1% solids with benzotrifluoride and 0.02% p-toluene sulfonic acid is added.

(B) Homopolymer of monomer V.—A glass ampoule is charged with 3 grams of monomer V, 12 grams of 1,1,2-trichloro-1,2,2-trifluoroethane and 0.03 gram of benzoyl peroxide, sealed and reacted for 26 hours at 75° C. to form the polymer. This solution is diluted to 1% solids with 2:1 benzotrifluoride:1,1,2-trichloro-1,2,2-trifluoroethane and 0.02% p-toluene sulfonic acid is added.

Several fabrics are padded at 30 lbs. nip pressure with these two 1% polymer solutions and cured 5 minutes at 130° C. Oil and spray ratings are measured initially, after laundering, after dry cleaning and, in some cases, after extraction with xylene hexafluoride for 24 hours in a Soxhlet extractor followed by a 5 minute dry at 130° C. The results are as follows:

are then charged to another glass ampoule and the ampoule is sealed under vacuum. This charge contains equimolar hydroxyl and isocyanate concentrations. The ampoule is then placed in a 150° C. oven for 40 hours. Infrared analysis of the resulting product indicates essentially complete reaction of the —OH and —NCO groups.

This solution is diluted to 0.6% solids and 0.03% p-toluene sulfonic acid is added. Cotton, nylon, rayon and wool fabrics are padded with this solution and cured 5 minutes at 130° C. The following initial properties are observed:

| Fabric | Oil | Spray |
|---|---|---|
| Cotton | 110 | 100 |
| Nylon | 130 | 100 |
| Rayon | 130 | 100 |
| Wool | 140 | 100 |

Various other combinations of fluorocarbon group- and epoxy group-containing monomers may be employed in the preparation of the polymers of the invention. More than one monomer of either of these types may be included in the polymers, as may other monomers which include neither such group. Variations of the techniques of polymerization and of applying the polymers to the substrates can also be employed.

EXAMPLE 9

By the procedure of Example 8, a glass ampoule charged with 8.0 grams of monomer II, and 2.0 grams

TABLE VII

| Polymer | Fabric | Initial | | Laundered and tumble dried | | Dry cleaned | | Extracted | |
|---|---|---|---|---|---|---|---|---|---|
| | | Oil | Spray | Oil | Spray | Oil | Spray | Oil | Spray |
| A. Monomer V: Hydroxypropyl methacrylate copolymer | Cotton | 110 | 100 | 70 | 50 | 100 | 70 | 90 | 90 |
| | Polyester | 110 | 100 | 80 | 80 | 100 | 80 | | |
| | Acrylic | 120 | 100 | 50 | 50 | 130 | 80 | | |
| | Nylon | 120 | 100 | 0 | 70 | 120 | 70 | | |
| | Rayon | 110 | 80 | 80 | 70 | 120 | 70 | | |
| B. Monomer V: Homopolymer | Cotton | 110 | 100 | 50 | 50 | 120 | 70 | 50 | 70 |
| | Polyester | 110 | 100 | 60 | 80 | 50 | 80 | | |
| | Acrylic | 120 | 90 | 0 | 0 | 70 | 80 | | |
| | Nylon | 110 | 100 | 0 | 50 | 90 | 70 | | |
| | Rayon | 120 | 80 | 0 | 0 | 110 | 50 | | |

EXAMPLE 8

A glass ampoule is charged with 4.0 grams of monomer IV, 4.0 grams of monomer II, 1.0 gram of 2-hydroxypropyl methacrylate, 1.0 gram of glycidyl methacrylate, 40 grams of benzotrifluoride and 0.05 gram of benzoyl peroxide and sealed. After 15 hours reaction at of 2-hydroxypropyl acrylate in 40.0 grams of 1,1,1-trichloroethane containing 0.05 gram benzoyl peroxide is heated at 75° C. for 16 hours. The resulting solution contains 19.0 percent polymer solids.

To 15.8 g. of the above solution (3.0 g. polymer) is added 2.22 g. of the above substituted tolylisocyanate (as 10 percent solution in $CH_3CCl_3$) and a catalytic trace of phenyl mercuric acetate. The mixture is sealed in an ampoule under vacuum and heated at 75° C. for 24 hours. The resulting solution contains 9.1 percent solid and contains only a trace of unreacted isocyanate groups detectable by infrared spectroscopy. It contains about 2.6 percent hydroxyl groups.

The solution is diluted to 0.6 percent solids with perchloroethylene and 0.03 percent p-toluene sulfonic acid added (this is unnecessary). The solution is padded on cotton, wool, nylon and viscose and dried 5 minutes at 130° C. Averages over the four test pieces are for oil rating 87 and for spray rating 93. Samples of the treated cotton and viscose are abraded and then average an oil rating of 60. When other fluoroaliphatic- and hydroxy-containing copolymers are reacted in similar manner with substituted or unsubstituted isocyanates, treating agents for fabrics are obtained which are applied by padding as above or other conventional methods.

What is claimed is:
1. The combination of:
  (I) a textile fabric with resin-type fabric treatment rendered oil and water repellant by
  (II) fluorine-containing copolymer of
    (a) acrylic, methacrylic, or α-chloroacrylic ester of fluoroaliphatic alcohol containing 3 to 18 perfluorinated carbon atoms having at least sufficient perfluorinated carbon atoms to provide about 5 percent of fluorine in said copolymer and of
    (b) comonomers comprising hydroxyalkylacrylate or hydroxyalkyl methacrylate, said copolymer having a carbon-to-carbon main chain, and hydroxyl groups in an amount of not less than 0.05 percent by weight of said copolymer separated from oxygen or nitrogen atoms by at least two carbon atoms.
2. The combination of claim 1 wherein the fluoroaliphatic alcohol is perfluoroalkanesulfonamidoalkanol.
3. The combination of claim 1 wherein the fluoroaliphatic alcohol is omegaperfluoroalkylalkanol.
4. The combination of claim 2 wherein the copolymer comprises as one comonomer,

$$C_8F_{17}SO_2N(CH_3)C_{11}H_{22}OCOC(CH_3)=CH_2$$

as methacrylic ester of fluoroaliphatic alcohol.
5. The combination of claim 2 wherein the copolymer comprises as one comonomer, $$C_7F_{15}CH_2OCO—C(CH_3)=CH_2$$

as methacrylic ester of fluoroaliphatic alcohol.

References Cited
UNITED STATES PATENTS

| | | | |
|---|---|---|---|
| 2,642,416 | 6/1953 | Ahlbrecht et al. | 117—155 X |
| 2,803,615 | 8/1957 | Ahlbrecht et al. | 117—161 X |
| 3,068,187 | 12/1962 | Bolstad et al. | 117—126 X |
| 3,102,103 | 8/1963 | Ahlbrecht et al. | 117—143 X |
| 3,232,790 | 2/1966 | Enders et al. | 117—141 X |
| 3,341,497 | 9/1967 | Sherman et al. | 117—138.8 X |
| 3,356,628 | 12/1967 | Smith et al. | 117—161 X |
| 3,384,627 | 5/1968 | Anello et al. | 117—155 X |

WILLIAM D. MARTIN, Primary Examiner

M. R. P. PERRONE, JR., Assistant Examiner

U.S. Cl. X.R.

117—76, 126, 138.8, 139.4, 139.5, 141, 143, 145, 155